United States Patent [19]

Werth

[11] 3,877,984
[45] Apr. 15, 1975

[54] ALKALI METAL-METAL CHLORIDE BATTERY

[75] Inventor: John J. Werth, Princeton, N.J.

[73] Assignee: ESB Incorporated, Philadelphia, Pa.

[22] Filed: Apr. 24, 1974

[21] Appl. No.: 463,520

[52] U.S. Cl. ............... 136/6 F; 136/6 LF; 136/20; 136/83 T
[51] Int. Cl. ......................................... H01m 35/00
[58] Field of Search ........... 136/20, 6 LF;6 FS, 6 F, 136/153–155, 83 R, 83 T

[56] References Cited
UNITED STATES PATENTS
3,663,295  5/1972  Baker ............................. 136/6 FS
3,751,298  8/1973  Senderoff ......................... 136/6 LF Primary Examiner—John H. Mack
Assistant Examiner—C. F. LeFevour

[57] ABSTRACT

A secondary battery utilizing a molten alkali metal negative reactant, a metal chloride positive reactant, a molten alkali metal chloraluminate electrolyte and a selectively-ionically-conductive separator positioned between the negative and the positive reactants.

13 Claims, 3 Drawing Figures

ALKALI METAL-METAL CHLORIDE BATTERY

BACKGROUND OF THE INVENTION

1. Field of the Invention

This invention relates to a secondary battery utilizing a molten alkali metal negative reactant with a solid separator, a metal chloride positive reactant and molten salt electrolyte. More particularly, the solid separator is selectively-ionically-conductive with respect to cations of the negative reactant; the positive reactant comprises metal chloride and the molten electrolyte salt comprises molten alkali metal chloraluminate. This battery possesses a voltage potential substantially higher than most batteries now known in the art which utilize molten salt electrolytes and an operating temperature substantially below the operating temperature of other molten salt batteries possessing even relatively higher voltage potentials.

2. Description of the Prior Art

The use of molten or fused salts as electrolytes in secondary batteries in not new to the art. Such batteries utilize as the electrolyte an inorganic salt composition which is solid and non-conducting at ordinary temperatures. However, when the cell is activated by heating it to a temperature sufficiently high to fuse or melt the electrolyte, the molten electrolyte becomes conductive so that electrical energy may be withdrawn therefrom. Such types of secondary batteries are known for their high energy storage and power output capabilities.

Typical secondary batteries of this type utilize a molten alkali metal as the anode-reactant, a cationically-conductive crystalline structure as a separator electrolyte, and a molten sodium polysulfide or sulfur cathodic reactant-electrolyte which will, during charging and discharging, contain ionic sodium polysulfide. The voltage potential of such a battery is generally in the range of from about 2 to 2.2 volts. It is recognized by those skilled in the art, however, that batteries of this type cannot operate below about 265°C because the sodium polysulfide which is present in the cathodic reactant-electrolyte during charging and discharging must be maintained in the molten state and its melting point is as high as 350°C depending on the state of the charge. It is equally well-known that this operation of this type of battery at about or above 265°C cannot be carried out without attendant problems. For example, sodium polysulfide is a strong oxidizing agent at these elevated temperatures and will tend to effect rapid corrosion, thus seriously reducing the useful life of the battery.

A novel secondary battery has now been discovered which utlizes a metal chloride positive reactant in contact with a molten alkali metal chloraluminate electrolyte. This battery can operate at a temperature as low as from about 180°C to about 200°C and greatly reduce the corrosion problems since sodium chloraluminate at temperatures of from about 180°C to about 200°C is not a strong oxidizing agent. Additionally, it has been found that the voltage potential of the novel battery of this invention approaches or exceeds 3 volts.

SUMMARY OF THE INVENTION

This invention is directed to a novel secondary battery comprising in combination a molten alkali metal negative reactant, a metal chloride positive reactant, a solid member separating the negative reactant and the positive reactant, and a molten electrolyte on the positive reactant side of the solid member. The solid member which separates the negative and positive reactants is selectively-ionically conductive with respect to the cations of the molten alkali metal negative reactant. The molten electrolyte on the positive side of the solid member comprises molten alkali metal chloraluminate. The alkali metal of the negative reactant is also present in the alkali metal chloraluminate.

DESCRIPTION OF THE INVENTION

Figure 1:
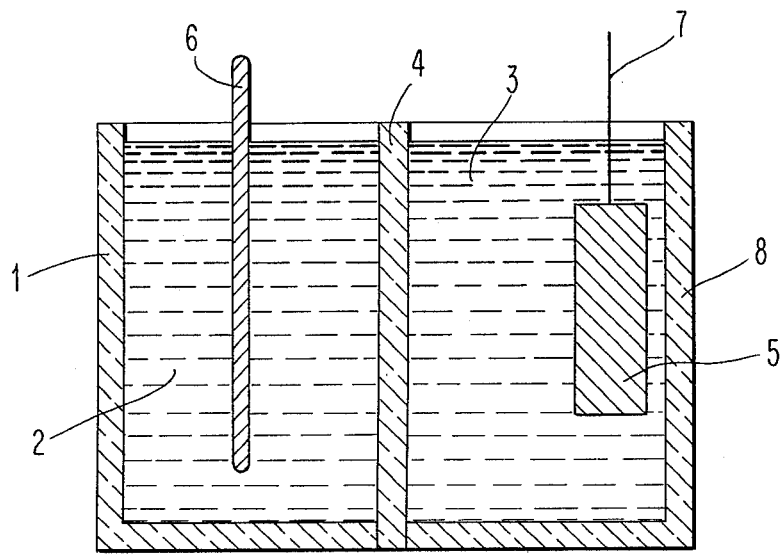
FIG. 1 is a schematic, cross-sectional view of a simple cell in accordance with this invention.

In the operation of the secondary or rechargeable battery of this invention, a high voltage potential is achieved by utilizing a molten alkali metal negative reactant and a metal chloride positive reactant, separating the two by means of a solid member which is selectively-ionically conductive with respect to cations of the molten alkali metal negative reactant, and maintaining on the positive reactant side of the solid separating member a molten electrolyte comprising molten alkali metal chloraluminate.

In accordance with this invention, the negative reactant or reductant is an alkali metal or mixture of alkali metals maintained above its melting point when the cell is in operation. The negative reactant is initially heated by any conventional means such as induction heating by electrical means, direct heating, or indirect heat exchange with a suitable heated fluid exchange means. The negative reactant functions as a conductor through which electrons flow to the external circuit during discharge. While no critical limitations are imposed upon the alkali metal selected for use as a negative reactant herein, the desired operating temperatures of this battery are preferably within the range of from about 180°C to about 200°C and the metal selected should therefore preferably have a melting point within or below this temperature range. The preferred metal for use as the negative reactant is sodium.

The positive reactant of the present invention comprises metal chloride or a mixture of metal chlorides. The specific metal chlorides selected for use will be determined by such factors as the end use to which the battery is to be put; the economics involved, e.g., the cost of starting materials; and the specific alkali metal chloraluminate electrolyte selected for use in the battery. Two criteria must however be satisfied by the metal chloride selected. First, it must be soluble to some extent in the alkali metal chloraluminate electrolyte of the battery; and second, it must be compatible with the other components of the battery, e.g., it must not attack the selectively-ionically-conductive solid member which separates the positive reactant and negative reactant of the battery.

So long as these two criteria are satisfied, the selection of the specific metal chloride to be utilized becomes a practical question rather than a critical one, i.e., depending on economics, end use and the like. Useful metal chlorides include antimony trichloride, cupric chloride, ferric chloride, and $NiCl_2$, antimony trichloride being preferred.

The solid member which separates the negative reactant and the positive reactant in the instant invention must be selectively-ionically-conductive with respect to cations of the molten metal negative reactant. Materials suitable for use as the solid separator include glass, beta aluminas and other cation conductive crystalline and/or ceramic materials which are resistant to the molten metal negative reactant and have satisfactorily low resistivities. The preferred separator comprises a beta alumina cationically-conductive crystalline structure consisting essentially of a structural lattice and alkali metal cations which are mobile in relation to said lattice when a difference of electrical potential is provided on opposite sides thereof. The lattice preferably is made of a major portion by weight of ions of aluminum and oxygen and a minor portion by weight of ions by metal having a valence not greater than 2 in crystal lattice combination such as lithium and magnesium. The solid separator member may be prepared by any art known means, see for example, U.S. Pat. No. 3,535,163, so long as the useful end product is selectively-ionically-conductive with respect to the cations of the molten alkali metal negative reactant employed.

The electrolyte utilized in the present invention makes possible a substantial reduction in the operating temperature of molten salt batteries as compared with those presently known and used in the art. For example, the operating temperature of the normal molten alkali metal-molten sulfur secondary battery wherein the molten cathodic electrolyte is an ionized combination of sodium and sulfur, i.e., ions of sodium polysulfide, $Na_2S_5$, the operating temperature is recognized to be well above 200°C and closer to 300°C, the melting temperature of sodium pentasulfide being as high as 265°C. In marked contract, the battery of the present invention utilizes an electrolyte on the positive reactant side of the solid separating member which comprises molten alkali metal chloraluminate and permits the operation of the instant battery to be carried out at temperatures of 180°C to about 200°C. It is possible, however, that batteries within the scope of this invention can operate at even lower temperature, since the melting point of the electrolyte is as low as about 125°C depending on the state of the charge. By the term molten alkali metal chloraluminate as used herein is meant a mixture of those atoms, molecules, and ions present upon the heating of the particular alkali metal chloraluminates to these operating temperatures, e.g., alkali metal ions, alkali metal chloride molecules, alkali metal chloraluminate molecules, chloride ions, chlorine atoms, $AlCl_3$, $AlCl_4^-$, and $Al_2Cl_7^-$. These will vary according to the particular alkali metal utilized in the chloraluminate. Sodium is preferred. The advantages of operating at this reduced temperature are of course apparent, e.g., reduced corrosion, increased battery life, and reduced cost of containers and seals, e.g., silicone rubber may be used as a negative gasket seal and teflon as a positive gasket seal.

The alkali metals useful as negative reactants in this invention are also useful in the metal chloraluminate. However, the alkali metal utilized in any particular battery as the negative reactant must also be present in at least one of the alkali metals present in the alkali metal chloraluminate of that particular battery.

In the battery of the present invention the positive reactant is mixed with the metal chloraluminate by any means known in the art, e.g., it is possible to mix sodium chloride and aluminum chloride together with the positive reactant and heat the resultant mix until ions of sodium chloraluminate and the positive reactant are formed within the cell, i.e., a sodium chloraluminate-positive reactant melt. It should be noted that while the battery of this invention is an alkali metal-metal chloride battery, the metal chloride which is present in the cell, i.e., present in the alkali metal chloraluminate-positive reactant melt within this cell, may be added initially as the metal itself, picking up chloride ions from the ionized sodium chloraluminate upon charging. Therefore, even though a metal was added initially, the positive reactant of the cell will be a metal chloride in the charged state. The metal amount of positive reactant present in this cell is not critical; however, it should be noted that the capacity of the cell is directly related to the amount of metal present in this cell in the positive reactant metal chloride, i.e., the more metal present from the positive reactant metal chloride, the greater the capacity of the cell. The necessary amount which must be added, therefore, can be readily determined by one skilled in the art after the decision has been made as to the desired capacity and the end use to which the cell is to be put.

In the operation of the battery of this invention, the separator is a selectively-ionically-conductive separator which separates the negative reactant and the positive reactant both physically and electronically, yet which allows charge and discharge through the migration of alkali metal ions (originating from the alkali metal chloraluminate) across the separator. At the negative, the alkali metal yields electrons during discharge, forming alkali metal ions which transport through the separator; the reverse takes place during charge.

The positive electrode mechanism involves, during charge, the release of electrons to the external circuit from the metal of the positive reactant metal chloride, whether such metal was originally added as metal or as the metal chloride. Subsequent to this release of electrons, the resultant metal ions will combine with chloride ions present in the melt to form the metal chlorides which constitute the positive reactant of the invention. This faradaic transformation yields high energy. As stated previously herein, the metal chlorides thus formed, which constitute the positive reactant metal chlorides of the battery of the invention, must be to some extent soluble in the molten alkali metal chloraluminate. The actual degree of solubility is, however, not critical. As stated above, during charge, metal atoms of the metal of the positive reactant release electrons to the external circuit. At the same time, however, negatively charged chloride and chloraluminate ions from the alkali metal chloraluminate melt are attracted to the surface of the now positively charged metal ions and combine therewith to form additional metal chloride positive reactant. During discharge the reverse takes place.

If increased conductivity is desired, conductive carbon may be added to the alkali metal chloraluminate-positive reactant metal chloride melt in any desired amount.

Referring now to FIG. 1, a single cell secondary battery according to this invention is constructed having a negative cell container 1 which may be made of any suitable material or materials which are not attacked by molten alkali metal at the operating temperature of the cell, e.g., carbon steel, aluminum, certain ceramics, certain heat and chemical resistant polymers, a suitable glass or an alpha alumina or derivative thereof, all thermally insulated with fiberglass, rockwool or other insulation. Inside container 1 is the molten alkali metal negative reactant 2, e.g., sodium. It is separated from the alkali metal chloraluminate electrolyte-metal chloride positive reactant melt 3 by means of a solid separating member 4 which is selectively-ionically-conductive to cations. Positive container 8 may be made of any suitable material such as glass, ceramic, teflon, tungsten and the like. Current collector 5 may be made of any suitable material such as for example, tungsten wire, carbon rods and the like. Leads 6 and 7 provide means for connecting the cell with an external circuit and closing the circuit. The external circuit, not further shown, may include a voltmeter, ammeter, etc.

During the operation of this battery, the temperature of the alkali metal chloraluminate electrolyte-metal chloride positive reactant melt is maintained at from about 180°C to about 200°C and the voltage potential of the battery is from about 2.5 to about 3.5 (for $SbCl_3$) volts. Both the specific energy and the voltage potential will vary with the particular couple used in a specific battery. If for example, a sodium-cupric chloride couple is used, the theoretical yield will be about 470 Whrs/lb. of reactant. If the couple is a sodium-ferric chloride couple, the theoretical yield would be about 360 Whrs/lb. of reactant, while the theoretical yield for a sodium-antimony trichloride couple would be about 375 Whrs/lb. of reactant.

lector was the steel sodium container. The positive current collector was a ¼ inch diameter tungsten rod located in the center of the positive compartment. The current collector was sealed to the Pyrex glass with a Monel Gyrolok fitting containing Teflon ferrules.

2. Reactant addition: The cells were first assembled and sealed to the beta alumina separators before any reactants were added. The sodium was then added in a molten state into the negative compartment and sealed with a pipe plug. The positive reactants — carbon, metal, chloride, sodium chloride, aluminum trichloride — were added as powders into the positive compartment and sealed with the Gyrolok fitting.

3. Temperature control: Salt was transformed into a molten condition by placing cells in Hoskins furnace and temperature was controlled to within 1°C by means of an ECS temperature controller. Cells were operated at 200°C. These cells contained approximately 1.5 watt-hours of energy; under these conditions the temperature was not self sustaining, and a furnace was necessary to maintain temperature. In cells of reasonable size, i.e., 1 K watt-hour, the temperature will be self sustaining once the cell is operating.

EXAMPLE 1

Carbon 0.3g Vulcan XC72-R
Salt 0.56g NaCl, 1.087g $AlCl_3$, 0.5g $CuCl_2$

4. Carbons: In all cells, the carbon utilized was Vulcan XC72-R. This is essentially a non-porous conduc-

| Cycle | Mode (D=disch) (C=charge) | Current (ma) | Polarization (IR) (mV) | Time (hrs) | Voltage Limits | Temp. 200°C |
|---|---|---|---|---|---|---|
| 1 | D | 20 | — | 5.8 | — | |
| 2 | C | 20 | 200 | 1.67 | 2.50–3.92 | |
| 2 | D | 20 | 850 | 1.67 | 3.60–2.20 | |
| | | Efficiency = 2.50/3.15 = 80% | | | | |
| 3 | C | 20 | 200 | 1.67 | 2.50–3.92 | |
| 3 | D | 20 | 750 | 1.67 | 3.60–2.20 | |
| 4 | C | 20 | 150 | 2.30 | 2.55–3.92 | |
| 4 | D | 20 | 850 | 2.10 | 3.40–2.20 | |
| 4 | C | 20 | 200 | 2.50 | 2.50–3.90 | |
| 4 | D | 10 | 750 | 10.20 | 3.60–2.05 | |
| 5 | C | 10 | 200 | 9.40 | 2.30–3.90 | |
| 5 | D | 10 | 850 | 9.50 | 3.60–2.05 | |
| 6 | C | 10 | 200 | 9.40 | 2.20–3.90 | |
| 6 | D | 10 | 1000 | 9.30 | 3.55–2.05 | |
| 7 | C | 10 | 150 | 9.30 | 2.20–3.90 | |
| 7 | D | 10 | 1000 | 9.20 | 3.55–2.05 | |

At the 10 ma rate Joule/g = (9.4)(.01)(3000)(2.55)/3.05 = 280 Joule/g
Average Charge Voltage = 3.17
Average Discharge Voltage = 2.55    Efficiency = 80.5%

| Cycle | Mode | Current (ma) | Polarization (mV) | Time (hrs) | Voltage Limits | |
|---|---|---|---|---|---|---|
| 8 | C | 10 | 150 | 1.42 | 2.20–2.85 | |
| 8 | C | 15 | 100 | 3.50 | 2.87–3.60 | |
| 8 | D | 15 | 800 | 4.17 | 3.40–2.05 | |
| 9 | C | 15 | 250 | 3.91 | 2.27–3.60 | |
| 9 | D | 15 | 750 | 3.85 | 3.40–2.05 | |
| 10 | C | 15 | 250 | 3.85 | 2.30–3.60 | |
| 10 | D | 15 | 850 | 3.80 | 3.45–2.05 | |
| 11 | C | 20 | 300 | 2.50 | 2.30–3.60 | |

At the 15 ma rate Joule/g = (3.9)(.015)(3600)(2.5)/3.05 = 172 Joule/g
Average Charge Voltage = 3.20
Average Discharge Voltage = 2.45    Efficiency = 76%

EXAMPLES

The following examples are intended to be merely illustrative of the invention and not in limitation thereof. Unless otherwise indicated, all quantities are by weight.

The following information applies to all of the cells tested in the examples, unless otherwise indicated:

1. Makeup of cells: The cells consisted of a Pyrex glass positive container and a carbon steel negative container. The negative seal was silicone rubber, and the positive seal was Teflon. The negative current coltive furnace black. Its bulk density in air is approximately 0.2 g/cc, making it a very fluffy powder.

EXAMPLE 2

Figure 2:
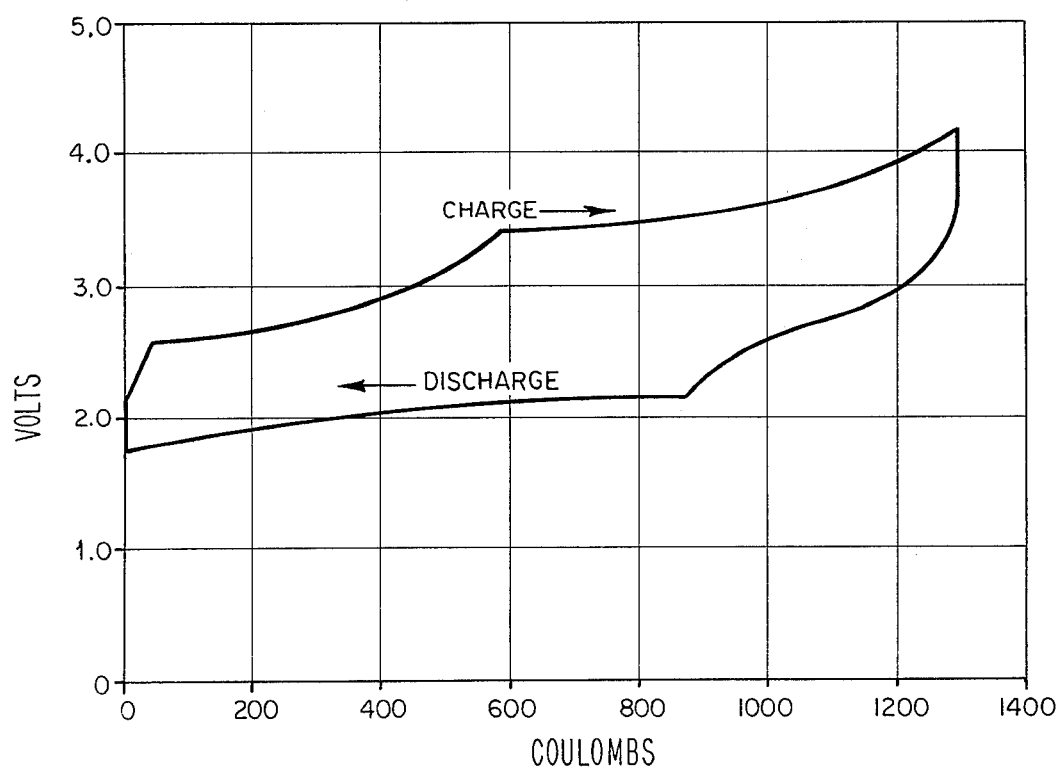
FIG. 2 is a graphic representation of the charge-discharge cycle of a cell of this invention.

Carbon 1.4g washed PWA
Salt 4.5g (75% $AlCl_3$, 25% NaCl), 0.95g $FeCl_3$
Charge Cycle = 50 ma from 1.85V to 4.0V, 7.2 hr rate
Discharge Cycle = 50 ma from 4.0V to 1.85V, 7.2 hr rate Cycle No. = 14
Capacity = 2,900 Joule; 575 Joule/g
Efficiency = 68.5%
Temp. = 380°F (193°C)
See FIG. 2 for charge-discharge cycle

EXAMPLE 3

Figure 3:
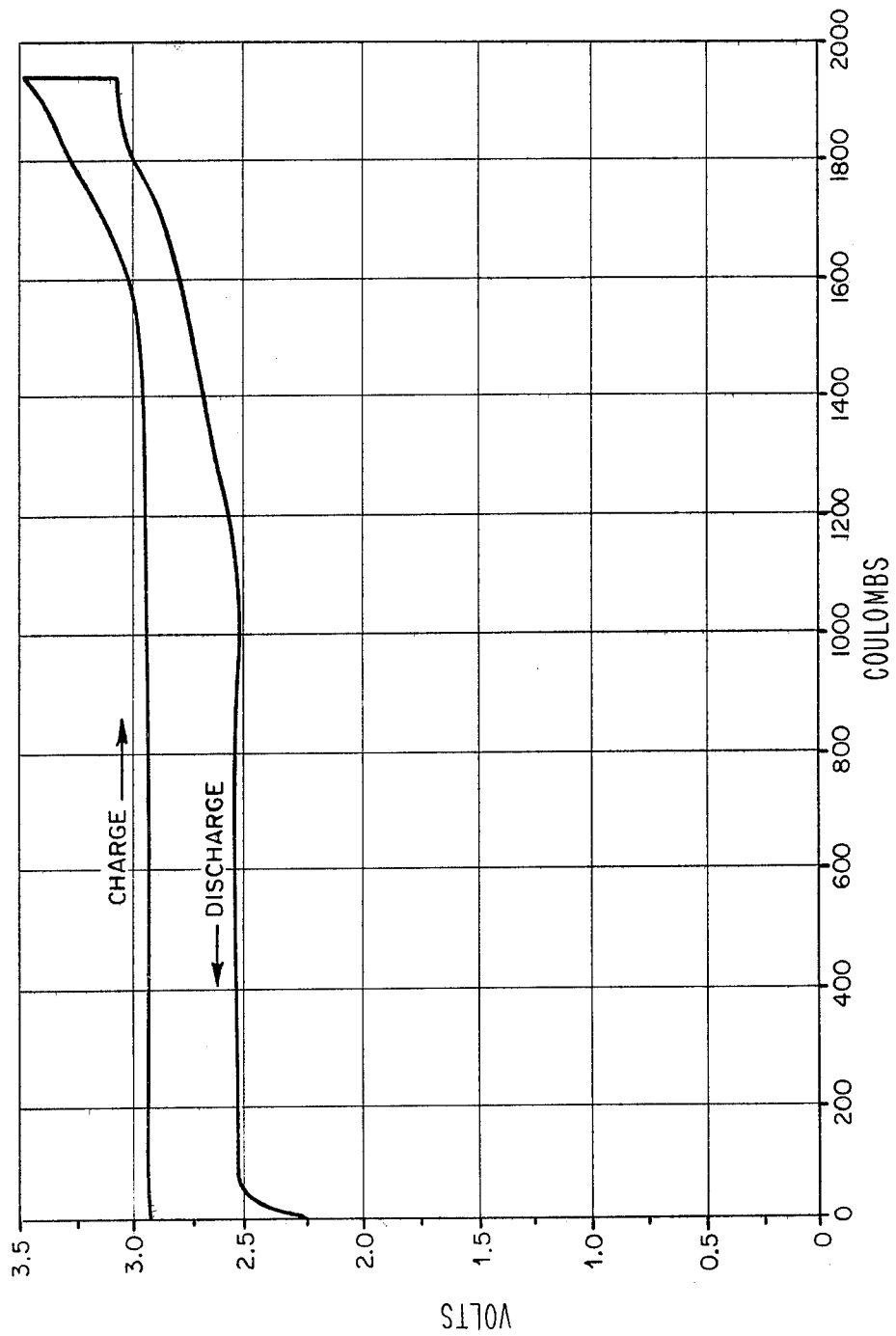
FIG. 3 is a graphic representation of the charge-discharge cycle of another cell of this invention.

Carbon 0.45g Vulcan XC72-R
Salt 2.22g $AlCl_3$, 0.64g NaCl, 1.6g $SbCl_3$
Charge — Discharge Current = 30 ma
Capacity = 5,160 Joules; 1,050 Joules/g
Efficiency = 88%
See FIG. 3 for charge-discharge cycle The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A secondary battery comprising in combination:
   a. a negative reactant consisting essentially of a molten alkali metal;
   b. a positive reactant comprising metal chloride;
   c. a solid member separating the negative and positive reactants, said member being selectively-ionically-conductive with respect to cations of said molten alkali metal negative reactant; and
   d. a molten alkali metal chloraluminate electrolyte on the positive reactant side of the solid member, wherein the alkali metal of the negative reactant is also present in the alkali metal chloraluminate.

2. A battery according to claim 1 wherein the melting point of the electrolyte is from about 125°C to 200°C.

3. A battery according to claim 1 wherein the alkali metal of the negative reactant and the chloraluminate is sodium.

4. A battery according to claim 1 wherein the solid member is beta alumina.

5. A battery according to claim 3 wherein the solid member is beta alumina.

6. A battery according to claim 5 wherein the melting point of the electrolyte is from about 125°C to 200°C.

7. A battery according to claim 1 wherein the positive reactant is antimony trichloride.

8. A battery according to claim 1 wherein the positive reactant is cupric chloride.

9. A battery according to claim 1 wherein the positive reactant is ferric chloride.

10. A battery according to claim 7 wherein the alkali metal of the negative reactant and the chloraluminate is sodium.

11. A battery according to claim 7 wherein the solid member is beta alumina.

12. A battery according to claim 10 wherein the solid member is beta alumina.

13. A battery according to claim 12 wherein the melting point of the electrolyte is from about 125°C to 200°C.

* * * * *